United States Patent [19]

Baheti et al.

[11] Patent Number: 4,884,656
[45] Date of Patent: Dec. 5, 1989

[54] SNAP-IN PLATE MOUNT

[75] Inventors: Ram J. Baheti; Dennis P. McGuire; Kaya A. Kosar, all of Erie, Pa.

[73] Assignee: Lord Corporation, Erie, Pa.

[21] Appl. No.: 274,704

[22] Filed: Nov. 15, 1988

Related U.S. Application Data

[63] Continuation of Ser. No. 130,546, Dec. 9, 1987, abandoned.

[51] Int. Cl.⁴ ............................................. F16F 15/00
[52] U.S. Cl. .................................. 181/207; 181/208; 248/581; 248/607; 248/634; 403/71; 403/163
[58] Field of Search ................................. 181/207–209; 248/570, 581, 603–615, 632–638, 678; 403/71, 163, 375

[56] References Cited

U.S. PATENT DOCUMENTS

| | | | |
|---|---|---|---|
| 2,155,999 | 4/1939 | Thompson | 248/24 |
| 3,091,795 | 6/1963 | Budwig | 16/2 |
| 3,721,411 | 3/1973 | Cunningham | 248/606 |
| 3,885,767 | 5/1975 | Olowinski et al. | 248/204 |
| 4,187,668 | 2/1980 | Olowinski et al. | 57/130 |
| 4,278,726 | 7/1981 | Wieme | 428/229 |
| 4,286,777 | 9/1981 | Brown | 248/635 X |
| 4,385,025 | 5/1983 | Salerno et al. | 264/255 |
| 4,406,557 | 9/1983 | Suzuki et al. | 403/71 |
| 4,482,265 | 11/1984 | Koza | 403/71 |
| 4,579,473 | 4/1986 | Brugger | 403/163 |

Primary Examiner—B. R. Fuller
Attorney, Agent, or Firm—Philip P. McCann; James W. Wright

[57] ABSTRACT

A mount capable of being pressed into an installed position in a hole in a plate. The mount has inner and outer concentric annular elements connected together by an intermediate flexible thermoplastic elastomeric web. The outer annular element has a peripheral groove which receives the plate and a deflectable wall with a chamfered outer surface and a series of slots. The flexible web permits the inner element to vibrate with respect to the plate and thereby isolate an item from the plate.

9 Claims, 1 Drawing Sheet

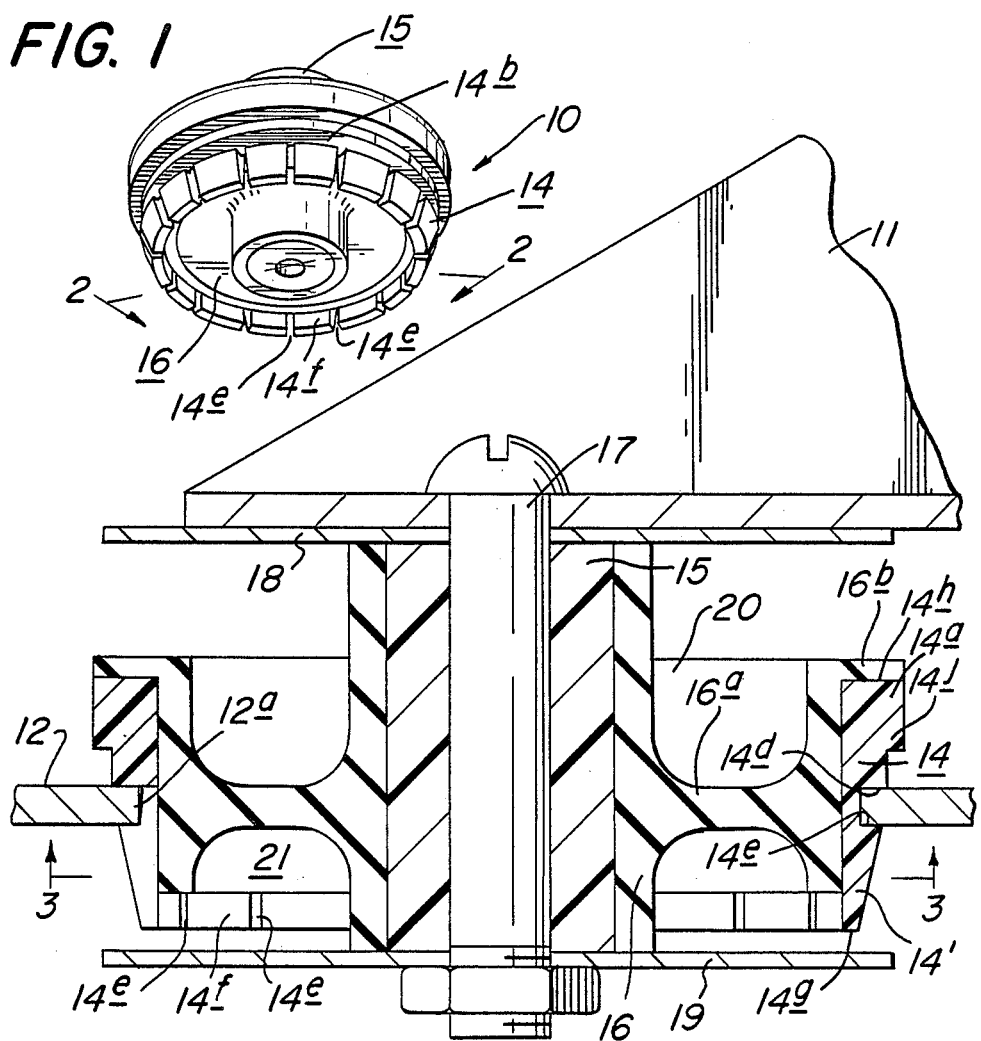
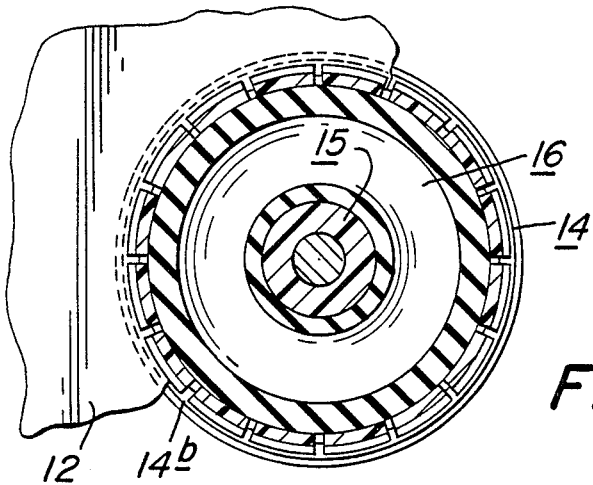

SNAP-IN PLATE MOUNT

This is a continuation of co-pending application Ser. No. 130,546 filed on Dec. 9, 1987, now abandoned.

FIELD OF THE INVENTION

The present invention relates to machine mounts, and more particularly, the present invention relates to so-called plate mounts.

BACKGROUND OF THE INVENTION

Plate mounts are often used to secure various types of equipment to a flat plate in a manner that isolates the plate from equipment vibrations and vice versa. For example, such a mount may be used to fasten a computer printer or typewriter on top of a horizontal surface. In a typical installation, a horizontal plate is provided with a hole, and the plate mount is connected to the plate adjacent the hole. The conventional plate mount includes an outer element which is attached stationary to the plate, an inner movable element concentric with the outer element, and a flexible elastomeric web movably connecting the inner element to the other element. The inner element is fastened to the equipment in a manner permitting it to vibrate normal to the plane of the underlying plate.

Known plate mounts of the aforedescribed type usually have flanges fastened to the plate by bolts or like fasteners. While such plate mounts may function satisfactorily in certain applications, they have limitations. For instance, installation is more expensive because of the labor required to secure the mounts in place. Moreover, unless installed properly, the fasteners can loosen under certain operating conditions. Such mounts are also not as inexpensive to manufacture as desired.

U.S. Pat. No. 4,385,025 discloses a plate mount of the aforedescribed type wherein the elements are formed by a coinjection molding process. U.S. Pat. No. 2,155,999 discloses a plate mount for a typewriter application. U.S. Pat. No. 3,885,767 discloses a plate mount laterally engageable in a notch in a plate and not requiring separate fasteners.

OBJECTS OF THE INVENTION

With the foregoing in mind, a primary object of the present invention is to provide a novel plate mount that can be installed quickly in a hole in a plate without any separate fasteners or tools.

Another object of the present invention is to provide an improved plate mount which can be snapped into place yet which resists loosening under normal operating conditions.

A further object of the present invention is to provide a unique plate mount that can be manufactured economically using modern injection molding equipment.

SUMMARY OF THE INVENTION

More specifically, the present invention provides a one-piece molded plate mount that can be snapped into place in a hole in a plate. The plate mount comprises an outer element having a peripheral groove which receives the plate, an inner element located concentrically within the outer element and movable in a path normal to the plane of the plate, and an intermediate flexible thermoplastic elastomeric web element interconnecting the inner and outer elements. The outer element has a chamfered outer surface extending away from the groove and a plurality of slots permitting radial deflection of the wall when the mount is pressed into place in the hole in the plate. Opposite sides of the intermediate web element are recessed to reduce material and enhance flexibility, and a portion of the intermediate web element overlaps an end edge of the outer element wall for providing a snubbing action with respect to the base of a mounted item.

BRIEF DESCRIPTION OF THE DRAWINGS

The foregoing and other objects, features and advantages of the present invention should become apparent from the following description when taken in conjunction with the accompanying drawing, in which:

FIG. 1 is a perspective view illustrating a molded plate mount embodying the present invention;

FIG. 2 is an enlarged cross-sectional view taken on line 2—2 of FIG. 1 and illustrating the plate mount connecting an item of equipment to a plate; and FIG. 3 is a fragmentary cross-sectional view in reduced scale taken on line 3-3 of FIG. 2.

DESCRIPTION OF THE PREFERRED EMBODIMENT

Referring now to the drawings, FIG. 1 illustrates a plate mount 10 which embodies the present invention. The mount 10 is shown in FIG. 2 connecting a leg 11 of an item of equipment, such as a computer printer, typewriter, or the like, to a horizontally disposed flat plate 12 having a hole 12a formed therein. The plate mount 10 can also be used in other applications where it is desired to isolate an item either statically or dynamically from a plate.

As best seen in FIG. 2, the plate mount 10 comprises an annular outer element 14 engaged with the plate 12, an inner tubular element 15 located concentric with the outer element 14 and the plate hole 12a, and a flexible elastomeric disphragm, or web, 16 movably connecting the inner element 15 to the other element 14. The inner element 15 may be provided with a through bore for receiving an attachment bolt 17 mounting a pair of washers 18 and 19, preferably larger in diameter than the hole 12a, on opposite sides of the plate 12.

In a conventional plate mount, the outer element is usually provided with a flange which engages one side of the plate and has holes for receiving attachment fasteners that extend through their own holes in the plate. As discussed heretofore, this type of plate mount has limitations which are overcome by the plate mount of the present invention.

In accordance with the present invention, the plate mount 10 is designed to be snapped into engagement with the plate 12 and to resist disengagement once installed. To this end, the outer annular element 14 has a tubular wall 14a in which is provided a continuous outwardly-facing peripheral groove 14b (FIG. 1). The groove 14b is defined by a pair of spaced shoulders 14c, 14d which engage opposite sides of the plate 12 around its hole 12a. The outer element wall 14a is provided with a chamfered outer peripheral surface 14' which, in the illustrated embodiment, depends below the groove 14b and hence below the plane of the plate 12. The outer element wall 14a has a plurality of spaced peripheral slots, such as the slots 14e, 14e defining therebetween a plurality of discrete finger-like flexible wall portions, such as the flexible portion 14f. The slots 14e extend upwardly from the lower edge 14g of the wall 14a to a location adjacent the upper shoulder 14c of the groove 14b therein, rendering the discrete flexible wall portions 14f relatively flexible in a radial direction. As a result, the mount 10 can be pressed into position in the plate hole 12a simply by pushing downwardly thereon, the chamfered surface 14' camming the flexible wall portions 14f radially inward until such time as the groove 14b is aligned with the plane of the plate 12, whereupon the flexible wall portions 14f flex outwardly into the locked positions illustrated in FIG. 2.

To enhance the flexibility of the wall portions 14f, as well as to reduce the amount of elastomeric material of the intermediate element 16, the intermediate element 16 is provided with upper and lower annular recesses 20 and 21 which are shaped to provide the intermediate of element 16 with a relatively thin web 16a which is about aligned with the groove 14b and located at about the plane of the plate 12. The elastomeric intermediate web element 16 has an upper peripheral portion 16b which extends outwardly across the upper end edge 14h of the outer element 14. The peripheral portion 16b of the intermediate elastomeric element 16 is positioned to contact the upper washer 18 in the event of extreme excursions of the mounted item, thereby providing a snubbing action.

Preferably, the inner and outer elements 14 and 15 are of molded rigid thermoplastic material, and the flexible element 16 is of molded thermoplastic elastomeric material. The inner and outer elements may be molded of the same material or of different materials. Alternatively, the inner member may be fabricated of metal.

By way of example, and not by way of limitation, the inner and outer elements are preferably molded of a glass-filled polypropylene, which is a rigid thermoplastic material. The intermediate element 16 is preferably molded of a polyolefin based thermoplastic elastomer. These materials provide a relatively flexible thermoplastic elastomeric material which bonds well to the inner and outer thermoplastic elements. Preferably, the intermediate element 16 is bonded directly to the inner and outer elements 14 and 15 simply by being injected into a mold containing the inner and outer elements 14 and 15 at a temperature of injection sufficient to melt the surfaces of the inner and outer elements and thereby to form a fusion bond therewith. The bond thus-formed provides sufficient shear resistance to enable the mount 10 to carry static and dynamic loads imparted normal to the plane of the plate 12, such as along the axis of the bolt 17. The flexibility of the intermediate web element 16 accommodate deflections in other directions as well.

In view of the foregoing, it should be apparent that the present invention now provides an improved plate mount which can be snapped into position in a hole in a plate without requiring any separate fasteneers or special tools. The installation is quick and easy, and can be accomplished readily either manually or by robotic assembly equipment. Furthermore, the plate mount 10 can be manufactured economically by high speed mass production injection molding techniques.

While a preferred embodiment of the present invention has been described in detail, various modifications, alterations and changes may be made without departing from the spirit and scope of the present invention as defined in the appended claims.

We claim:

1. In a plate mount useful in securing a member to a plate having a through bore in a manner permitting the member to vibrate relative to a plane of the plate, the mount having an outer rigid molded thermoplastic element adapted to be fastened to the plate around said bore, an inner element adapted to be fastened to the member, and an intermediate flexible molded elastomeric element extending between said inner and outer elements and mounting said inner element for motion relative to said outer element, the improvement wherein said outer element includes a wall having a pair of spaced shoulders for receiving the mounting plate and permitting relative movement in a transverse direction between the inner element and the outer element when installed, said wall having an end edge and a chamfered outer peripheral surface between said end edge and one of said shoulders, said wall having a plurality of peripherally spaced slots extending axially from said end edge for providing a series of discrete flexible wall portions that flex radially inward during insertion of the mount into the plate bore and radially outward upon installation, whereby the mount is fastened to the plate without any separate fasteners.

2. A plate mount according to claim 1 wherein the intermediate elastomeric element has a relatively thin web portion extending between said inner and outer elements.

3. A plate mount according to claim 2 wherein both said inner and outer elements are of molded thermoplastic material and said intermediate elastomeric element is of thermoplastic material which is bonded thereto.

4. A plate mount according to claim 3 wherein said outer element is annular and has a circular periphery for mounting in a circular hole in the plate and disposing said elastomeric web portion in about the plane of the plate.

5. A plate mount according to claim 4 wherein said outer element wall has another end edge opposite said one end edge, and said intermediate elastomeric element extends across said other end edge for providing a snubbing action.

6. In a plate mount useful in securing a member to a plate having a through bore in a manner permitting the member to vibrate relative to a plane of the plate, the mount having an outer rigid molded thermoplastic element adapted to be fastened to the plate around said bore, an inner element adapted to be fastened to the member, and an intermediate flexible molded elastomeric element extending between said inner and outer elements and mounting said inner element for motion relative to said outer element, the improvement wherein said outer element includes a wall having a pair of spaced shoulders for receiving the mounting plate and permitting relative movement in a transverse direction between the inner element and the outer element when installed, said wall having an end edge and a chamfered peripheral surface between said end edge and one of said shoulders, said wall having a plurality of peripherally spaced slots extending between said end edge and said one of said shoulders for providing a series of discrete flexible wall portions that flex radially during insertion of the mount into the plate bore.

7. In a plate mount useful in securing a member to a plate having a through bore in a manner permitting the member to vibrate relative to a plane of the plate, the mount having an outer rigid molded thermoplastic element adapted to be fastened to the plate around said bore, an inner element adapted to be fastened to the member, and an intermediate flexible molded thermoplastic elastomeric element extending between said inner and outer elements and mounting said inner element for motion relative to said outer element, at least said outer and intermediate elements being bonded together, the improvement wherein said outer element includes a wall having a pair of spaced shoulders providing therebetween a peripheral groove for receiving the mounting plate and permitting relative movement in a transverse direction between the inner element and the outer element when installed, said wall having opposite end edges and a chamfered outer peripheral surface extending between one of said end edges and one of said shoulders, said wall having a plurality of peripherally spaced slots extending from said one end edge into proximity with said groove for providing a series of discrete flexible wall portions that flex radially inward during axial insertion of the mount into the plate bore and radially outward upon installation, said web extending between said inner and outer elements in the region of said peripheral groove and having a portion extending across the other of said end edges for use in providing a snubbing action.

8. In a plate mount useful in securing a member to a plate having a through bore in a manner permitting the member to vibrate relative to a plane of the plate, the mount having an outer rigid molded thermoplastic element adapted to be fastened to the plate around said bore, an inner element adapted to be fastened to the member, and an intermediate flexible molded thermoplastic elastomeric element extending between said inner and outer elements and mounting said inner element for motion relative to said outer element, at least said outer and intermediate elements being bonded together, the improvement wherein said outer element includes a wall having a pair of spaced shoulders providing therebetween a peripheral groove for receiving the mounting plate and permitting relative movement in a transverse direction between the inner element and the outer element when installed, said wall having an end edge and a chamfered outer peripheral surface between said end edge and one of said shoulders, said wall having a plurality of peripherally spaced slots extending axially from said end edge to proximity with said groove for providing a series of discrete flexible wall portions that flex radially inward during axial insertion of the mount into the plate bore and radially outward upon installation, whereby the mount is fastened to the plate without any separate fasteners.

9. In a plate mount useful in securing a member to a plate having a through bore in a manner permitting the member to vibrate relative to a plane of the plate, the mount having an outer rigid molded thermoplastic element adapted to be fastened to the plate around said bore, an inner element adapted to be fastened to the member, and an intermediate flexible molded thermoplastic elastomeric element extending between said inner and outer elements and mounting said inner element for motion relative to said outer element, at least said outer and intermediate elements being bonded together, the improvement wherein said outer element includes a wall having a pair of spaced shoulders providing therebetween a peripheral groove for receiving the mounting plate and permitting relative movement in a transverse direction between the inner element and the outer element when installed, said wall having an end edge and a chamfered peripheral surface between said end edge and one of said shoulders, said wall having a plurality of peripherally spaced slots extending between said edge and said groove for providing a series of discrete flexible wall portions that flex radially during axial insertion of the mount into the plate bore.

* * * * *